United States Patent
Kim et al.

(10) Patent No.: US 9,864,201 B2
(45) Date of Patent: Jan. 9, 2018

(54) ELECTRONIC DEVICE INCLUDING FLEXIBLE DISPLAY UNIT AND OPERATION METHOD THEREOF

(71) Applicant: Samsung Electronics Co., Ltd., Gyeonggi-do (KR)

(72) Inventors: Younhyoung Kim, Gyeonggi-do (KR); Kyunghee Lee, Gyeonggi-do (KR); Kenhyung Park, Gyeonggi-do (KR); Chihyun Cho, Gyeonggi-do (KR); Changryong Heo, Gyeonggi-do (KR); Hyunsoo Kim, Gyeonggi-do (KR); Ikhyun Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 184 days.

(21) Appl. No.: 14/607,575

(22) Filed: Jan. 28, 2015

(65) Prior Publication Data

US 2015/0219902 A1    Aug. 6, 2015

(30) Foreign Application Priority Data

Feb. 6, 2014 (KR) .................. 10-2014-0013839

(51) Int. Cl.
- *G06F 1/16* (2006.01)
- *G02B 27/01* (2006.01)
- *G06F 3/01* (2006.01)

(52) U.S. Cl.
CPC ......... *G02B 27/0179* (2013.01); *G02B 27/01* (2013.01); *G02B 27/017* (2013.01); *G02B 27/0172* (2013.01); *G02B 27/0176* (2013.01); *G06F 1/1652* (2013.01); *G06F 3/013* (2013.01); *G02B 2027/0178* (2013.01); *G02B 2027/0181* (2013.01)

(58) Field of Classification Search
None
See application file for complete search history.

(56) References Cited

U.S. PATENT DOCUMENTS

| | | | |
|---|---|---|---|
| 6,522,474 B2 | 2/2003 | Cobb et al. | |
| 6,529,331 B2 | 3/2003 | Massof et al. | |
| 7,667,783 B2 | 2/2010 | Hong et al. | |
| 2006/0230286 A1* | 10/2006 | Kitada | G06F 21/32 713/186 |
| 2008/0106489 A1 | 5/2008 | Brown et al. | |
| 2010/0188422 A1 | 7/2010 | Shingai et al. | |
| 2013/0207946 A1* | 8/2013 | Kim | G09G 3/3225 345/204 |
| 2014/0266990 A1* | 9/2014 | Makino | G02B 27/017 345/8 |

(Continued)

FOREIGN PATENT DOCUMENTS

WO    2013/076994 A1    5/2013

*Primary Examiner* — Claire X Pappas
*Assistant Examiner* — Christopher Kohlman
(74) *Attorney, Agent, or Firm* — Cha & Reiter, LLC

(57) ABSTRACT

An electronic device has a flexible display. An apparatus and method for providing the electronic device includes: a display unit formed of flexible material having at least one curved surface, a transformation unit coupled to at least part of the display unit, and a control unit configured to alter the transformation unit to deform the at least one curved surface of the flexible material of the display unit.

20 Claims, 15 Drawing Sheets

(56) References Cited

U.S. PATENT DOCUMENTS

2014/0354791 A1* 12/2014 Lee .................... G06K 9/00228
348/77
2015/0077312 A1* 3/2015 Wang ................... G02B 27/017
345/7

* cited by examiner

ELECTRONIC DEVICE INCLUDING FLEXIBLE DISPLAY UNIT AND OPERATION METHOD THEREOF

CROSS-REFERENCE TO RELATED APPLICATION

This application claims the benefit under 35 U.S.C. §119 (a) of a Korean patent application filed on Feb. 6, 2014 in the Korean Intellectual Property Office and assigned Serial No. 10-2014-0013839, the entire disclosure of which is hereby incorporated by reference.

BACKGROUND

Field of the Disclosure

Embodiments of the present disclosure relate to an electronic device having a flexible display unit and an operation method thereof.

Description of the Related Art

With the remarkable growth of electronics-related technology, a great variety of electronic devices are increasingly popularized in these days. For example, a head-mounted display (HMD) device is a display wearable on a user's head that has been recently introduced into the marketplace. HMD devices may be classified into a closed-type HMDs where users are incapable of seeing an external environment and see-through type HMDs where users are capable of seeing the outside environment as well as a display image.

HMD devices of the see-through type use a transparent display which allow a user to conduct various operations offered for the HMD device which integrate views of the outside environment. Thus, a user can usually use this type HMD device like glasses and, if desired, obtain information through a connection with any external device. For example, this type HMD device may display simple information such as a notification message or offer augmented reality.

Since the HMD device of closed type is structured so as not to see the outside environment, a user can concentrate his or her attention on a display image. This type HMD device may output media contents stored in a smart phone, a table PC, a notebook, etc. to a large-sized virtual display (e.g., 40 inches sized or more), thus increasing the sense of reality. This type HMD device may allow playback of multimedia content such as a movie.

The range of the field of vision in humans may cover about 60 inward degrees and about 100 outward degrees when seeing with one eye, and may horizontally cover about 100 degrees when seeing with both eyes. Unfortunately, a conventional HMD device offers a flat-screen display having a smaller width than the range of the field of vision in humans. Therefore, the boundaries of the display may be seen to a user. This may disturb a user's immersion in an image offered through a display.

SUMMARY

Various embodiments of the present disclosure provide an electronic device, together with an operation method thereof, which has a flexible or transformable display unit and allows a change in the form (e.g., a curvature, a central position of a curved surface, etc.) of the display unit.

According to an embodiment of this disclosure, an electronic device may include a display unit formed of flexible material having at least one curved surface, a transformation unit coupled to at least part of the display unit, and a control unit configured to alter the transformation unit to deform the at least one curved surface of the flexible material of the display unit. According to an embodiment of this disclosure, an electronic device may include an image sensor unit adapted to capture an image of a user, a display unit formed of flexible material having at least one curved surface, and at least one transformation unit coupled to the display unit and configured deform the display unit in response to information on a user's eyes as identified in the image of the user captured by the image sensor unit.

According to an embodiment of this disclosure, a method for operating an electronic device may include including operations of obtaining setting information associated with a user's eye, and changing a form of at least one curved surface included in a display unit formed of flexible material, based on the obtained setting information.

DETAILED DESCRIPTION

Figure 1:
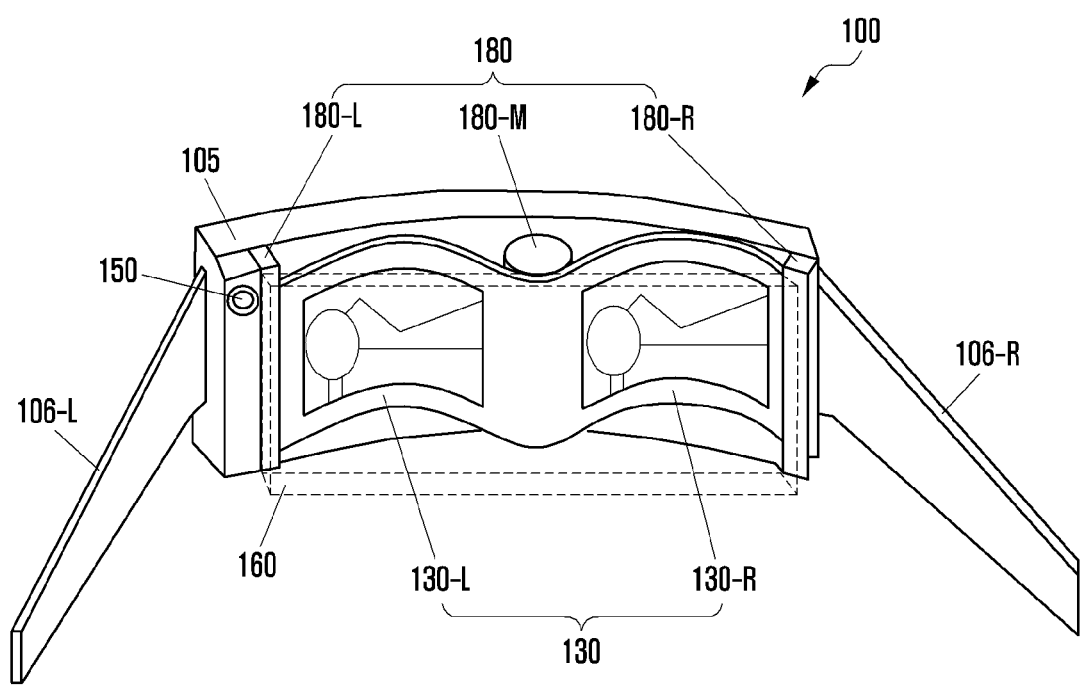
FIG. 1 is a perspective view illustrating an example electronic device in accordance with an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely example. Accordingly, those of ordinary skill in the art will recognize that various changes and modifications of the embodiments described herein can be made without departing from the ambit of the present disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

As used herein, the singular forms "a", "an", and "the" are intended to include the plural forms, including "at least one", unless the content clearly indicates otherwise. "Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

In this disclosure, an electronic device may be a device that involves a flexible or transformable display unit. For example, an electronic device may be a wearable device, a television, a monitor, and the like. The wearable device may include a head mount display (HMD) device. Although the HMD device will be described hereinafter as one embodiment, this is example only and not to be considered as a limitation of the present disclosure. It will be understood by those skilled in the art that the following description may be similarly applied to any other type electronic device.

Figure 2:
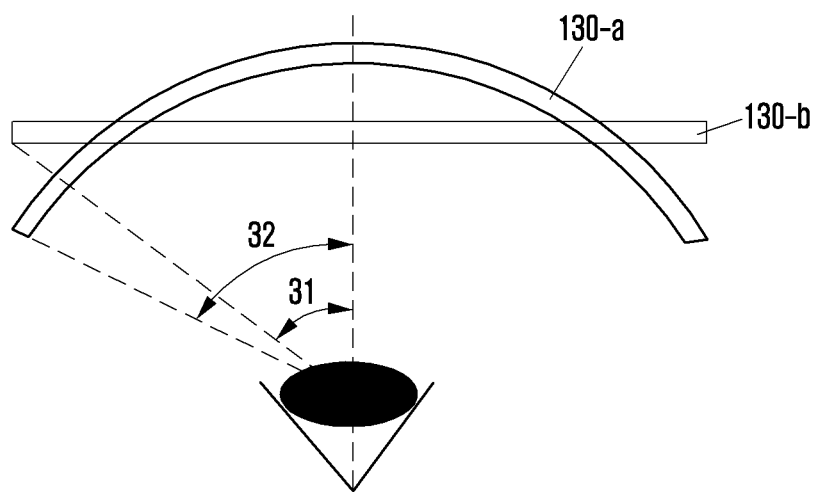
FIG. 2 is a schematic diagram illustrating a difference in viewing angle depending on the form of a display unit of an example electronic device in accordance with an embodiment of the present disclosure.
Figure 3A:
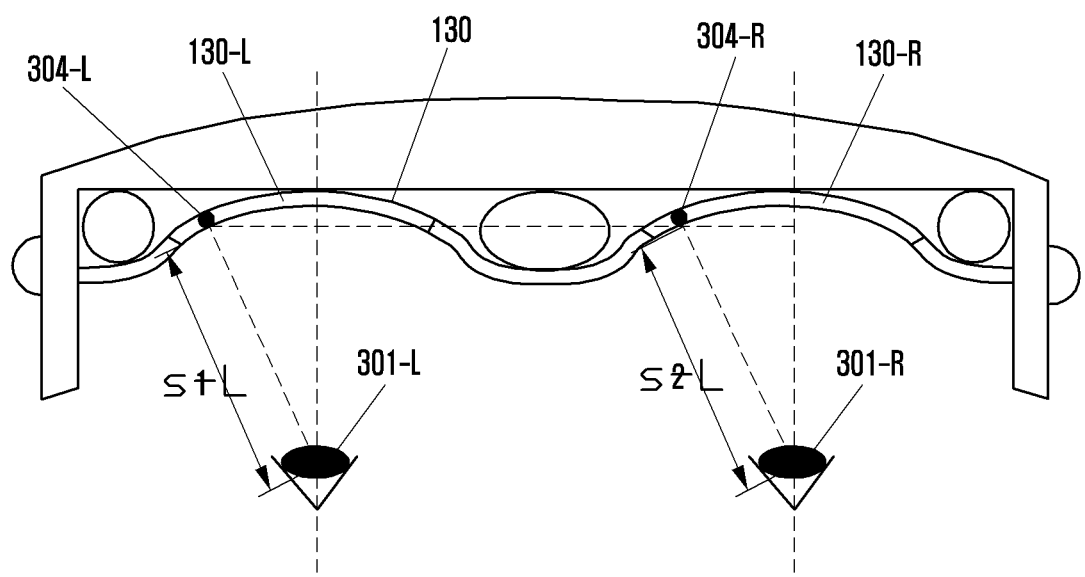
FIG. 3A and FIG. 3B are schematic diagrams illustrating a difference in image recognition depending on the form of an example display unit of an electronic device in accordance with an embodiment of the present disclosure.
Figure 3B:
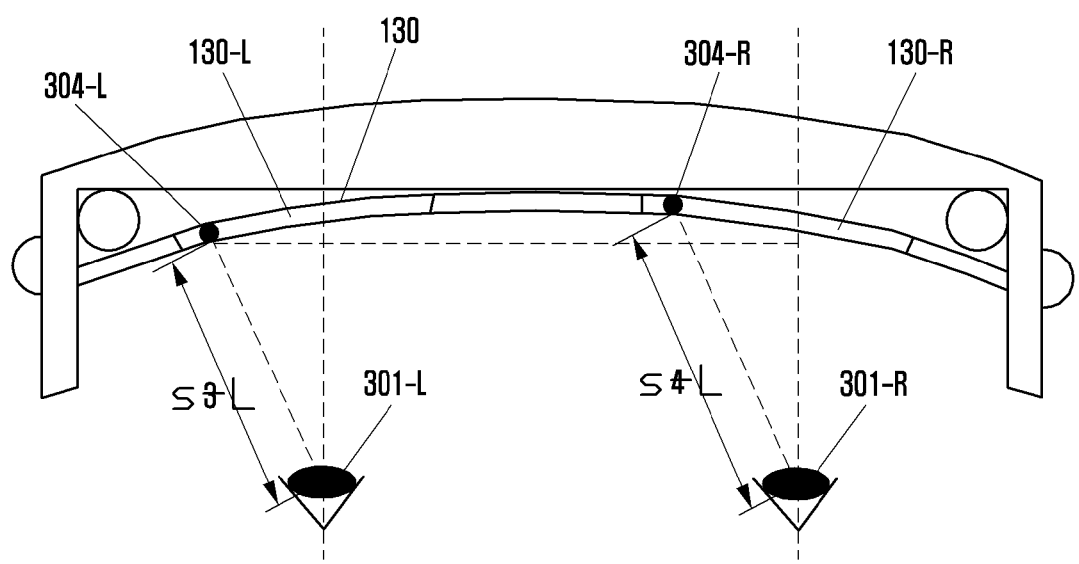

FIG. 1 is a perspective view illustrating an electronic device in accordance with an embodiment of the present disclosure. FIG. 2 is a schematic diagram illustrating a difference in viewing angle depending on the form of a display unit of an electronic device in accordance with an embodiment of the present disclosure. FIGS. 3A and 3B are schematic diagrams illustrating a difference in image recognition depending on the form of a display unit of an electronic device in accordance with an embodiment of the present disclosure.

Referring to FIGS. 1 to 3B, the electronic device 100 in an embodiment of this disclosure may be an HMD device having the form similar to that of a pair of eyeglasses. In other various embodiments, the electronic device may be an HMD device having any other form or any other type device such as, for example, a television, a smart phone, a tablet PC or Personal Computer, etc.), a navigation device, a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., electronic clothes, an electronic bracelet, an electronic necklace, an electronic appcessory, or a smart watch). The electronic device 100 may include a housing 105 and sidepieces 106-R and 106-L respectively connected to both ends of the housing 105. The housing 105 may include a display unit 130, an optical unit 160 (e.g., lens), a transformation unit 180, and an image sensor unit 150 (e.g., a camera module).

The housing 105 forms the external appearance of the electronic device 100 and may support the rear of the display unit 130. The sidepieces 106-R and 106-L may allow a user to wear the electronic device 100 at least partially supported on his or her ears. The optical unit 160 is located between the display unit 130 and user's eyes and may adjust an image perceived by a user. The image sensor unit 150 may recognize user's eyes (e.g., detecting a distance between eyes or watching for a user's gaze).

The display unit 130 may have at least one curved surface. The display unit 130 may display an image or a video on a part thereof. The display unit 130 formed of a curved surface can offer a wider viewing angle to a user than formed of a flat surface. For example, as shown in FIG. 2, a viewing angle 32 of a curved display unit 130-*a* is wider than a viewing angle 31 of a flat display unit 130-*b*.

For example, the display unit 130 may include a right display region 130-R for displaying a right image to be seen by a right eye and a left display region 130-L for displaying a left image to be seen by a left eye. In this case, the left and right display regions 130-L and 130-R may output the same image, and the left and right images may be recognized as a single virtual image to a user.

According to an example embodiment, the display unit 130 may have two curved surfaces. In case the display unit 130 has two curved surfaces as shown in FIG. 3A, a distance 11 from the left eye 301-L to the left image 304-L displayed on the left display region 130-L may be equal to a distance 12 from the right eye 301-R to the right image 304-R, which is the same image as the left image 304-L, displayed on the right display region 130-R. In case the display unit 130 has a single curved surface as shown in FIG. 3B, a distance 13 from the left eye 301-L to the left image 304-L displayed on the left display region 130-L may be different from (e.g., smaller than) a distance 14 from the right eye 301-R to the right image 304-R, which is the same image as the left image 304-L, displayed on the right display region 130-R. In this case, the same image 304-L and 304-R may be recognized as having different positions by both eyes, so that a user may fall into confusion of image recognition and thus feel dizzy.

Meanwhile, a viewing angle or a central distance between eyes may be varied according to users. If a distance between user's eyes is different from a distance between the center of the left display region 130-L and the center of the right display region 130-R, a user may feel dizzy due to a recognized image out of focus. In an embodiment of this disclosure, the electronic device 100 may include at least one transformation unit 180 configured to change the form of the display unit 130. For example, the transformation unit 180 may include the first transformation unit 180-L located at the left, the second transformation unit 180-M located at the middle, and the third transformation unit 180-R located at the right. The transformation unit 180 may change, for example, at least one of a curvature of the display unit 130 or a distance between the centers of two curved surfaces of the display unit 130. As shown in FIGS. 5A to 8B, the transformation unit 180 may be transformable support member for the display unit 130. Various embodiments of the transformation unit 180 will be described below with reference to FIGS. 5A to 8B.

Figure 4:
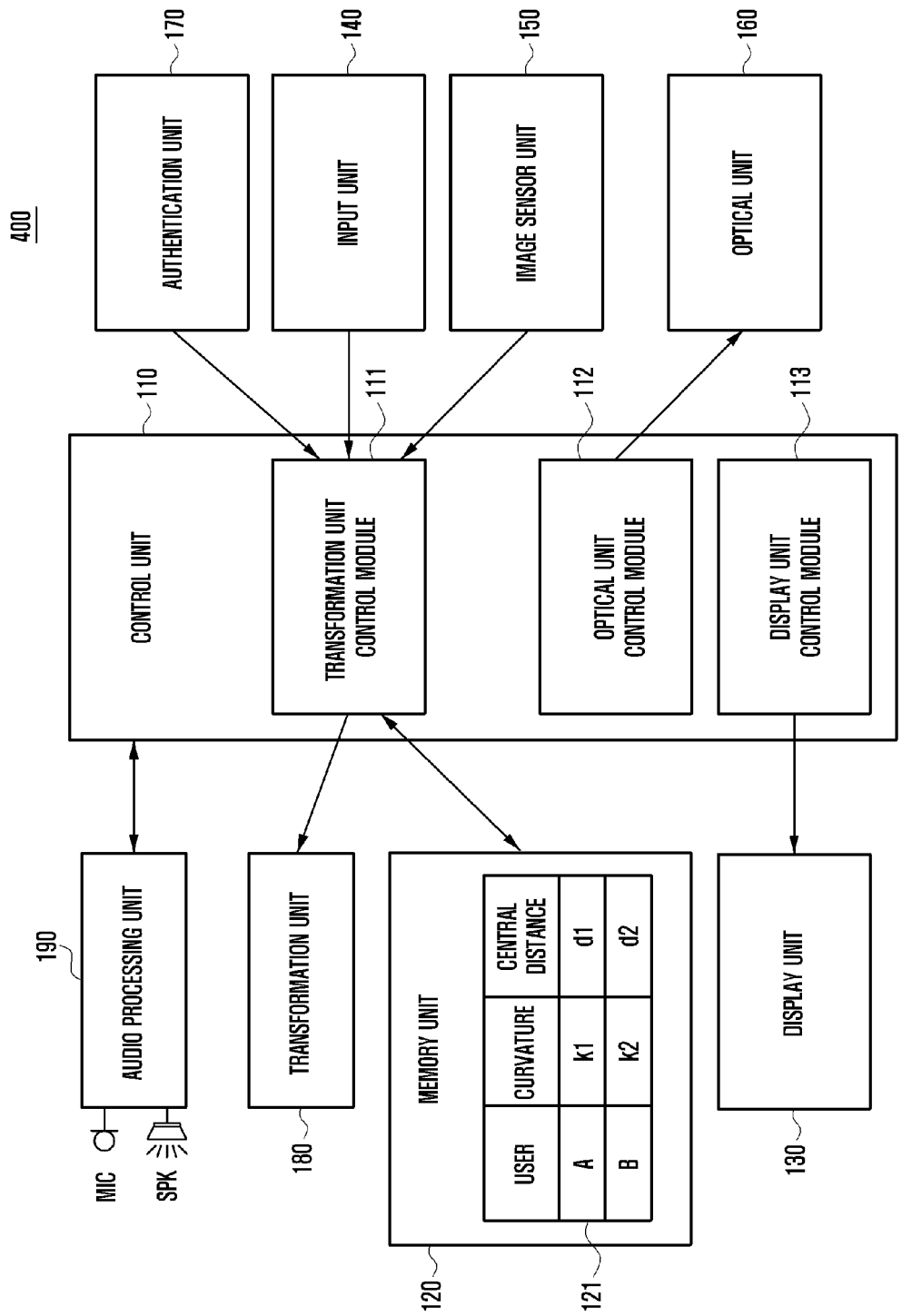
FIG. 4 is a block diagram illustrating an electronic device in accordance with an example embodiment of the present disclosure.

FIG. 4 is a block diagram illustrating an electronic device in accordance with an embodiment of the present disclosure.

Referring to FIG. 4, an electronic device 400 according to an embodiment of this disclosure may include a control unit 110 (or referred to as a processor), a memory unit 120, a display unit 130, an input unit 140 (or referred to as an input interface), an image sensor unit 150, an optical unit 160, an authentication unit 170, a transformation unit 180, and an audio processing unit 190. According to an embodiment, the electronic device 400 may be, but not limited to, the same or similar device as the electronic device 100. The control unit 110 may include therein a transformation unit control module 111, an optical unit control module 112, and a display unit control module 113.

The audio processing unit 190 may be connected with a speaker (SPK) for outputting a received audio signal, an audio signal associated with an audio file stored in the memory unit 120, etc. and a microphone (MIC) for sensing a user's voice or any other audio signal. In an embodiment of this disclosure, the audio processing unit 190 may output, through the speaker (SPK), various sound effects in connection with the operation of the electronic device 400. Additionally, in case a transformation mode is turned on or enabled, the audio processing unit 190 may obtain, through the microphone (MIC), an audio signal for controlling the transformation unit 180. For example, if an audio signal indicating a leftward move is inputted through the microphone (MIC), the audio processing unit 190 may transmit a signal corresponding to a leftward move to the transformation unit 180. Then the transformation unit 180 may move leftward under the control of the control unit 110.

The transformation unit 180 may change the form of the display unit 130. For example, the transformation unit 180 may change a curvature of the display unit 130 or a central position of a curved surface of the display unit 130. The transformation unit 180 may change manually or automatically the form of the display unit 130. The transformation unit 180 may be located at a part of the electronic device 400. For example, the transformation unit 180 may be located at one or more of upper, lower, left and right parts or front and rear parts of the display unit 130.

The transformation unit 180 may change the form of the display unit 130, based on information about user's eyes. For example, the transformation unit 180 may change the form of the display unit 130 according to user eye information obtained through the image sensor unit 150, a user's input for requesting a change of the form of the display unit 130, user authentication information, or setting information defined about a user.

A detailed description about the transformation unit 180 will be given below with reference to FIGS. 5A to 8B.

The authentication unit 170 may authenticate a user. For example, the authentication unit 170 may include a biometric sensor (e.g., a finger scan sensor, an iris scan sensor, etc.). Specifically, when wearing the electronic device 400 is sensed, the authentication unit 170 may recognize biometric information such as wearer's iris or fingerprint and then, using the recognized biometric information, authenticate a user. Alternatively, the authentication unit 170 may authenticate a user through identification information such as ID or password entered by a user using an input unit. When such authentication is completed, the authentication unit 170 may transmit information about the authenticated user to the control unit 110 (e.g., the transformation unit control module 111). In an embodiment, the authentication unit 170 may authenticate a user through a combination of the above-mentioned manners or equivalents.

The optical unit 160 may adjust (e.g., enlarge or reduce) and/or correct an image (e.g., a still image or a moving image) displayed on the display unit 130. The optical unit 160 may include at least one lens. Additionally, the optical unit 160 may be controlled under the control of the optical unit control module 112. For example, the optical unit 160 may be moved under the control of the optical unit control module 112 such that the center of the lens may be located on the same line as the center of curvature of the display unit 130 or the center of an image displayed on the display unit 130. In another example, the optical unit 160 may have a refractive index varied according to a change in curvature of the display unit 130. This may allow the correction of image distortion due to a change in curvature of the display unit 130. For example, the optical unit 160 may be formed of an electro-active lenticular lens. A detailed description regarding a change of the form of the optical unit 160 will be given below with reference to FIGS. 9 and 10.

The input unit 140 may receive various kinds of information from a user and create a corresponding input signal. The input unit 140 may have a plurality of input keys and function keys for setting various functions. For example, the functions keys may have navigation keys, side keys, or shortcut keys. Additionally, the input unit 140 may create a signal associated with a user setting or a function control and transmit the signal to the control unit 110. The input unit 140 may be formed of at least one of a ball joystick, an optical joystick, a wheel key, a touch key, a touch pad, and a touch screen, or any combination thereof. In an embodiment of this disclosure, the input unit 140 may create an input signal for turning on or off (or enabling or disabling) a transformation mode for changing the form of the display unit 130, an input signal for controlling (e.g., moving a position) the transformation unit 180, an input signal for entering authentication information for user authentication, or the like, and transmit the created input signal to the control unit 110.

The image sensor unit 150 is a device for obtaining an image of the subject. For example, the image sensor unit 150 may capture an image of the subject, convert the captured image into an electric signal, and store the electric signal as digital data. The image sensor unit 150 may be formed of a charge coupled device (CCD) image sensor, a complementary metal oxide semiconductor (CMOS) image sensor, or the like. For example, the image sensor unit 150 may be a camera module. Particularly, the image sensor 150 may support a function to recognize user's eyes (e.g., a user's gaze or a distance between eyes). For example, the electronic device 400 according to an embodiment of this disclosure may obtain user gaze information and then, based on the obtained information, measure a distance between user's eyes or a location of eyes.

The display unit 130 may display thereon various types of information, including various menus of the electronic device 400, entered by a user or to be offered to a user. For example, the display unit 130 may offer various screens associated with the use of the electronic device 400, such as an idle screen, a menu screen, a webpage screen, a call screen, and the like. Particularly, the display unit 130 may be a flexible or transformable display. According to an embodiment, the display unit 130 may include the left display region 130-L for displaying the first image to be seen by the left eye and the right display region 130-R for displaying the second image to be seen by the right eye. The left and right display regions 130-L and 130-R may output the same image (i.e., the same still image or the same moving image). Additionally, the form of the display unit 130 may be changed by the transformation unit 180. For example, the display unit 130 may be changed in a curvature or in a distance between the center of the left display region 130-L and the center of the right display region 130-R.

The memory unit 120 may store therein various programs or applications, including an operating system (OS), utilized for essential or optional functions of the electronic device 400, such as a sound reproduction function, an image viewer function, a video playback function, an internet access function, a text message function, a map service function, and the like. Additionally, the memory unit 120 may store therein various data, e.g., video data, game data, music data, movie data, map data, and the like.

In an embodiment of this disclosure, the memory unit 120 may store therein setting information 121 that defines various forms of the display unit to be used for controlling the form of the display unit per user. For example, the memory unit 120 may store therein the setting information 121 for the transformation unit 180 corresponding to the form of the display unit 130. The setting information 121 may include a curvature of the display unit 130 and a distance between user's eyes (e.g., a distance between centers of two curved surfaces of the display unit 130). Curvature information may include, for example, a horizontal length of a curved part.

Additionally, the memory unit 120 may store therein the setting information 121 or authentication information to be used for authenticating a specific user in case two or more users may use in common the electronic device 400. For example, the authentication information may be biometric information (e.g., iris information, fingerprint information, etc.). In another example, the authentication information may be a user's ID and password.

The setting information 121 may define, per user, a curvature and/or a central distance between centers of two curved surfaces of the display unit 130. For example, a user A may be linked to a curvature of k1 and a central distance of d1, and a user B may be linked to a curvature of k2 and a central distance of d2.

According to an embodiment, the memory unit 120 may store therein any information associated with a transformation unit control program designed to control the transformation unit 180. The transformation unit control program may contain commands for controlling the transformation unit 180 to change the form of the display unit 130 in response to user's manipulations or recognized user eyes or depending on an authenticated user.

According to an embodiment, the memory unit 120 may store therein any information associated with an optical unit control program designed to control the form of the optical unit 160. The optical unit control program may control the form of the optical unit 160 depending on a change of the form of the display unit 130. For example, the optical unit control program may control the location of the optical unit 160 such that the center of a curved surface of the display unit 130 and the center of the optical unit 160 may be located on the same line. Also, in case an image is distorted due to a change of the curvature of the display unit 130, the optical unit control program may correct such distortion by adjusting a refractive index of the optical unit 160.

The control unit 110 may control general operations of the electronic device 400 and flows of signals between internal blocks of the electronic device 400, and may also perform a function to process data. For example, the control unit 110 may be formed of a central processing unit (CPU), an application processor (AP), and the like. For example, the control unit 110 may be formed as a single core processor or a multi-core processor.

The control unit 110 may include the transformation unit control module 111, the optical unit control module 112, and the display unit control module 113. The control unit 110 may control an operation for changing the form of the display unit 130 and an operation for changing the form of the optical unit 160 or displaying an image.

The transformation unit control module 111 may control a change of the form of the display unit 130 by controlling the transformation unit 180. For example, the transformation unit control module 111 may control the transformation unit 180 by means of a user's input through a button, a touch pad, a touch screen, etc. or by means of a voice recognition through the microphone (MIC).

Additionally or alternatively, the transformation unit control module 111 may recognize user eyes (e.g., a central distance between eyes) and then control the transformation unit 180 in response to recognition results. For example, the transformation unit control module 111 may control the transformation unit 180 such that a distance between centers of two curved surfaces of the display unit 130 may correspond to a distance between recognized eyes. Also, in order to change the form of the display unit 130, the transformation unit control module 111 may control the transformation unit 180 such that the center of the recognized eyes and the center of a curved surface of the display unit 130 may make a straight line.

Additionally or alternatively, when it is detected that a user wears the electronic device 400, the transformation unit control module 111 may control the transformation unit 180 with reference to the setting information 121 (e.g., previously set by a user). Additionally or alternatively, when a user is authenticated through the authentication unit 170, the transformation unit control module 111 may retrieve information about the authenticated user from the setting information 121 and then control the transformation unit 180 with reference to the retrieved information.

The optical unit control module 112 may change the form of the optical unit 160, based on a change of the form of the display unit 130. For example, the optical unit control module 112 may move the optical unit 160 leftward or rightward such that the center of a convex part of the optical unit 160 may coincide with the center of a convex part of the display unit 130. Also, in case the optical unit 160 is formed of a device such as an electro-active lenticular lens capable of changing a curvature, the optical unit control module 112 may adjust a refractive index of the optical unit 160 in order to correct the distortion of an image due to a change in curvature of the display unit 130. If the optical unit 160 has two or more lenses, the optical unit control module 112 may correct an image by adjusting the arrangement or intervals of lenses.

The display unit control module 113 may control an output position of an image (e.g., a still image or moving images). For example, if the form of the display unit 130 is changed, the display unit control module 113 may control the location of an image output region such that the center of an image may be offered to the center of a convex part of the display unit 130. Also, the display unit control module 113 may correct and output an image such that no distortion of image happens depending on curvature of the display unit 130.

Meanwhile, although it is described hereinbefore that the transformation unit 180 is controlled by the control unit 110 (e.g., the transformation unit control module 111), this is example only and not to be considered as a limitation. Alternatively, the transformation unit 180 may have a control function, and in this case the transformation unit control module 111 may be removed.

Although not illustrated in FIG. 4, the electronic device 400 may selectively further include elements for providing additional functions, such as a broadcast receiving module, a sensor module having a plurality of sensors (e.g., a motion sensor, an illuminance sensor, an acceleration sensor, a geomagnetic sensor, etc.), a digital sound playback module such as an MP3 module, and the like. According to a digital convergence tendency today, such elements may be varied, modified and improved in various ways, and any other elements equivalent to the above elements may be additionally or alternatively equipped in the electronic device 400. As will be understood by those skilled in the art, some of the above-mentioned elements in the electronic device 400 may be omitted or replaced with another.

Figure 5A:
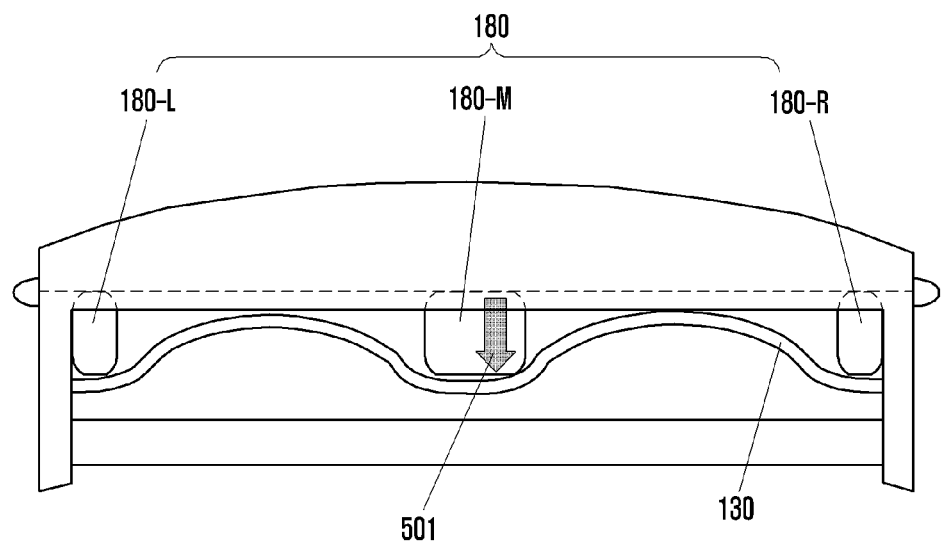
FIG. 5A, FIG. 5B, and FIG. 5C are schematic diagrams illustrating the operation of a transformation unit of an electronic device in accordance with an example embodiment of the present disclosure.
Figure 5B:
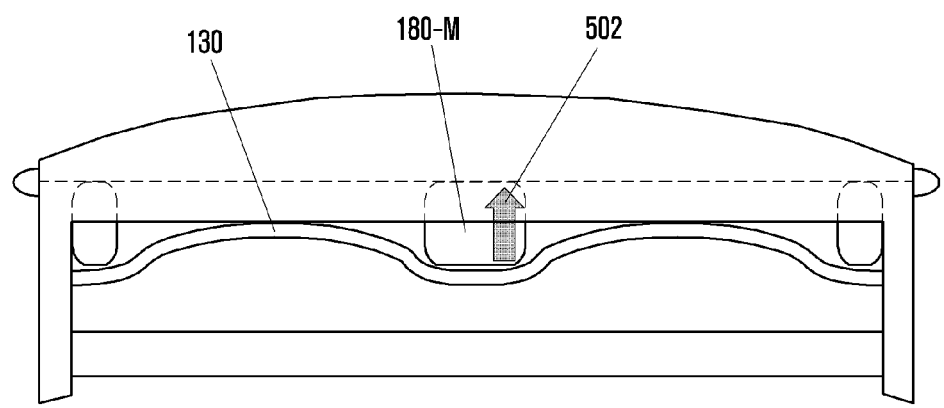
Figure 5C:
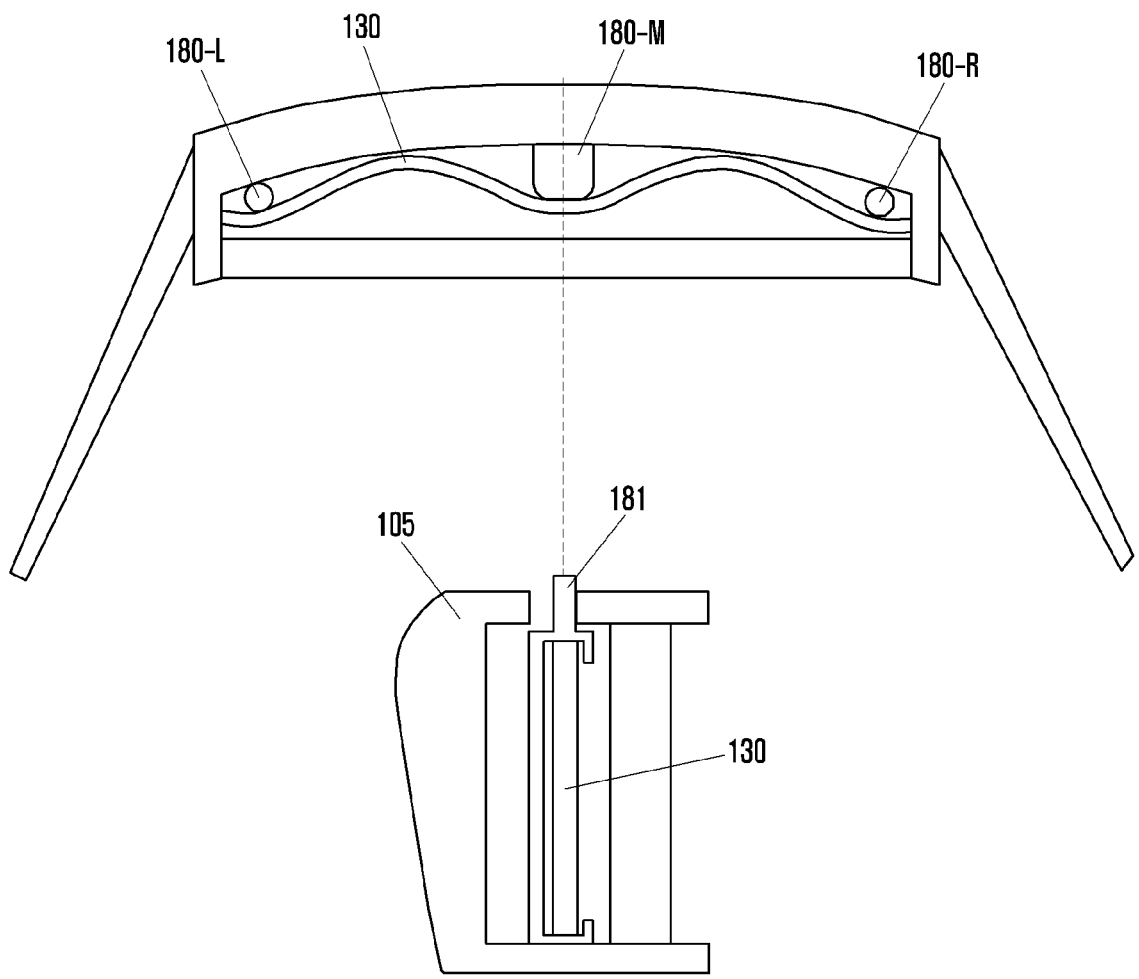

FIGS. 5A, 5B and 5C are schematic diagrams illustrating the operation of a transformation unit of an electronic device in accordance with an embodiment of the present disclosure.

Referring to FIGS. 5A and 5B, in an embodiment of this disclosure, at least part of the transformation unit 180 may move forward, as indicated by a reference numeral 501, to the display unit 130, or move backward, as indicated by a reference numeral 502. The form of the display unit 130 may be changed in response to this movement of at least part of the transformation unit 180. In an embodiment, the transformation unit 180 may have the first transformation unit 180-L, the second transformation unit 180-M, and the third transformation unit 180-R. As shown in FIG. 5A, a forward movement 501 of the transformation unit 180, at least the second transformation unit 180-M, may cause an increase in curvature of the display unit 130. As shown in FIG. 5B, a backward movement 502 of the transformation unit 180, at least the second transformation unit 180-M, may cause a decrease in curvature of the display unit 130.

According to an embodiment, when at least one of the first transformation unit 180-L, the second transformation unit 180-M, or the third transformation unit 180-R moves, the others may move together. According to another embodiment, the transformation unit 180-L, the second transformation unit 180-M, and the third transformation unit 180-R may move separately and independently.

The transformation unit 180 may have an automatic structure or a manual structure. In case of an automatic structure, the transformation unit 180 may move in response to a user's input (e.g., a button, a touch pad, a touch screen, a voice recognition, etc.). Also, the transformation unit 180 may move depending on the location of user's eyes or the setting information 121 defined for a user. The transformation unit 180 may have a driving unit (not shown) to be used for changing the form of the display unit 130.

Meanwhile, the transformation unit 180 may have a manually controlled structure as shown in FIG. 5C. For example, using a protrusion 181 located on the second transformation unit 180-M and protruded from the housing 105, or using the input unit 140, a user can manually drive the second transformation unit 180-M to move forward or backward. According to an embodiment, the second transformation unit 180-M may surround at least part of the rear, front, upper and lower sides of the display unit 130. In response to a movement of the second transformation unit 180-M, a part of the display unit 130 may be moved.

The transformation unit 180 is not limited to structures and shapes shown in FIGS. 5A to 5C and may alternatively have various other structures and shapes for allowing a change in curvature of a curved surface of the display unit 130 or in a distance between centers of curved surfaces of the display unit 130.

Figure 6A:
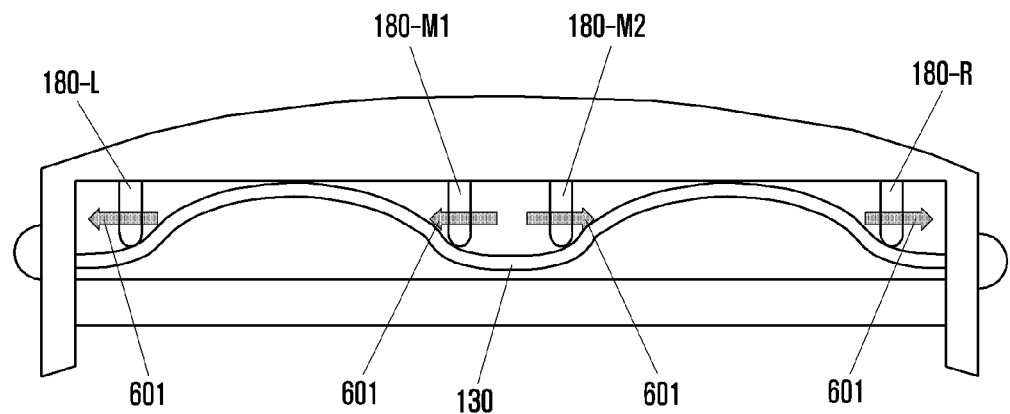
FIG. 6A and FIG. 6B are schematic diagrams illustrating the operation of a transformation unit of an electronic device in accordance with another example embodiment of the present disclosure.
Figure 6B:
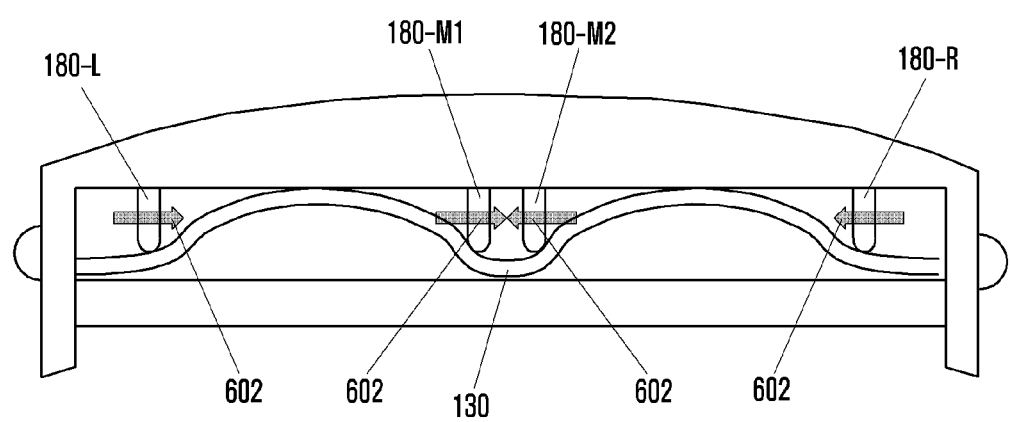

FIGS. 6A and 6B are schematic diagrams illustrating the operation of a transformation unit of an electronic device in accordance with another embodiment of the present disclosure.

Referring to FIGS. 6A and 6B, the electronic device 400 may have two transformation units 180-M1 and 180-M2 which are located near the middle of the display unit 130. These transformation units 180-M1 and 180-M2 may be used for adjusting a distance between the center of the left display region 130-L and the center of the right display region 130-R to correspond to a distance between the centers of user eyes. The electronic device 400 may increase a distance 130 (hereinafter referred to as a central distance of curved surface) between the centers of curved surfaces of the display unit 130. For example, as shown in FIG. 6A, the electronic device 400 may control the transformation units 180-L, 180-M1, 180-M2, and 180-R to move outward from the middle as indicated by a reference numeral 601. Therefore, the centers of curved surfaces of the display unit 130 can move to increase a central distance of curved surface. In contrast to this, the electronic device 400 may also decrease a central distance of curved surface. For example, as shown in FIG. 6B, the electronic device 400 may control the transformation units 180-L, 180-M1, 180-M2, and 180-R to move toward the middle as indicated by a reference numeral 602. Therefore, the centers of curved surfaces of the display unit 130 can move to decrease a central distance of curved surface. Meanwhile, a structure shown in FIGS. 6A and 6B is example only and not to be considered as a limitation. Any other structure for allowing a change in a central distance of curved surface of the display unit 130 may be alternatively used.

Figure 7A:
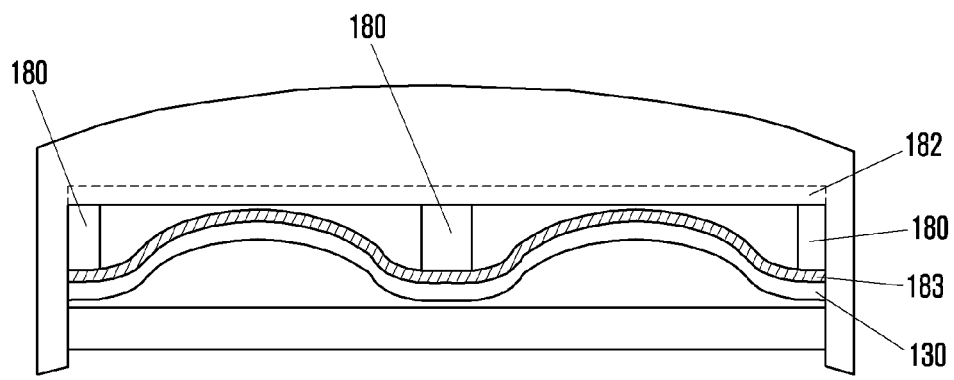
FIG. 7A and FIG. 7B are schematic diagrams illustrating the operation of a transformation unit of an electronic device in accordance with still another example embodiment of the present disclosure.
Figure 7B:
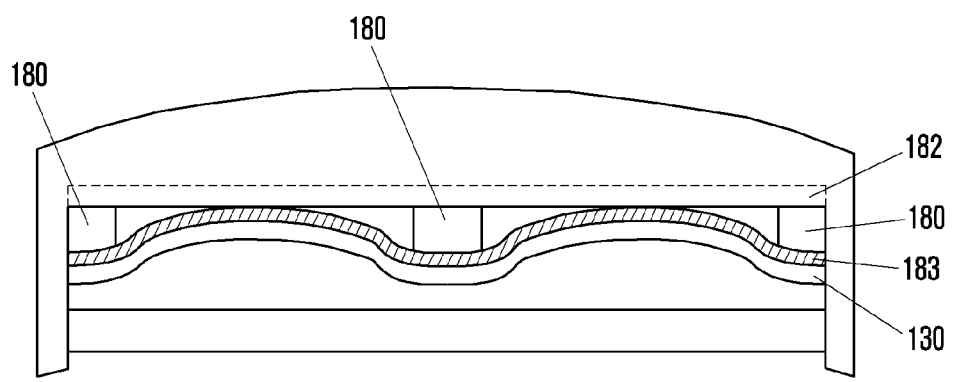

FIGS. 7A and 7B are schematic diagrams illustrating the operation of a transformation unit of an electronic device in accordance with still another embodiment of the present disclosure.

Referring to FIGS. 7A and 7B, the transformation unit 180 may have transformable material which can be changed in shape when a given condition is satisfied. This transformable material may be formed of at least one of piezoelectric material, shape memory alloy, shape memory polymer, electro-active polymer, or an electromechanical actuator (e.g., a rotary motor, a linear motor, a mechanical actuator, or a pneumatic actuator). For example, the transformable material may be changed in shape in response to an electronic signal such as a direct-current (DC) voltage, an alternating-current (AC) voltage, a biased AC (e.g., AC-DC coupling), or a pulsed DC (e.g., pulsed width modulation), or in response to an optical source (e.g., ultraviolet rays), a thermal source (e.g., temperature), water pressure, atmospheric pressure, and the like.

As shown in FIGS. 7A and 7B, power supply units 182 and 183 may be located near at least part of the transformation unit 180. At least one of the power supply units 182 and 183 may be formed of transformable material (e.g., elastic sheet).

As shown in FIGS. 7A and 7B, the transformation unit 180 may be changed in shape in response to a voltage applied to at least one of the power supply units 182 and 183. Then the form of the display unit 130 can be changed accordingly.

Figure 8A:
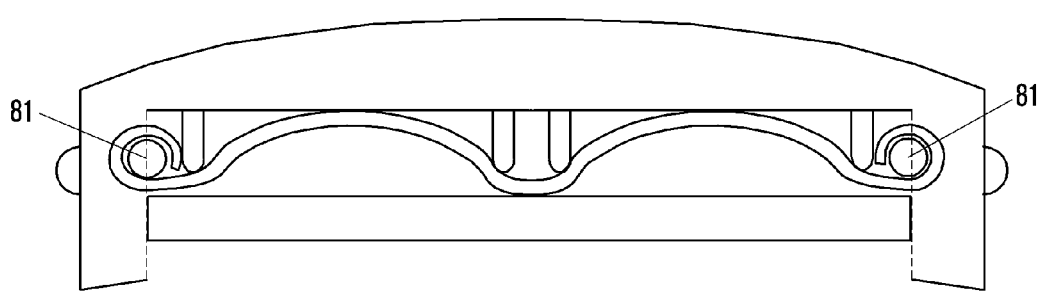
FIG. 8A and FIG. 8B are schematic diagrams illustrating the operation of a transformation unit of an electronic device in accordance with yet another example embodiment of the present disclosure.
Figure 8B:
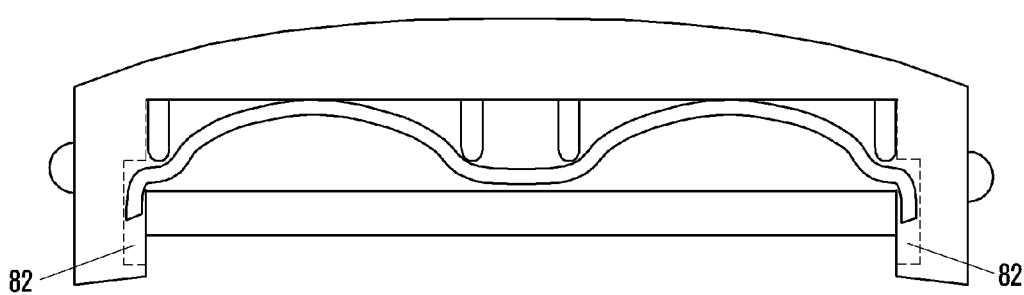

FIGS. 8A and 8B are schematic diagrams illustrating the operation of a transformation unit of an electronic device in accordance with yet another embodiment of the present disclosure.

Referring to FIG. 8A, the transformation unit 180 of the electronic device 400 may have rollers 81 disposed at both ends thereof. Alternatively, referring to FIG. 8B, the transformation unit 180 may have grooves 82 formed at both ends thereof. In this case, at least part of edge portions of the display unit 130 may be located in the grooves 82. If there is any remaining portion at both edges of the display unit 130 after the curvature or central position of curved surface of the display unit 130 is adjusted, this remaining portion may be wound on the roller 81 or inserted into the groove 82.

Meanwhile, various types of the transformation unit 180 discussed above in various embodiments may be applied selectively or in combination to the electronic device 400.

Figure 9:
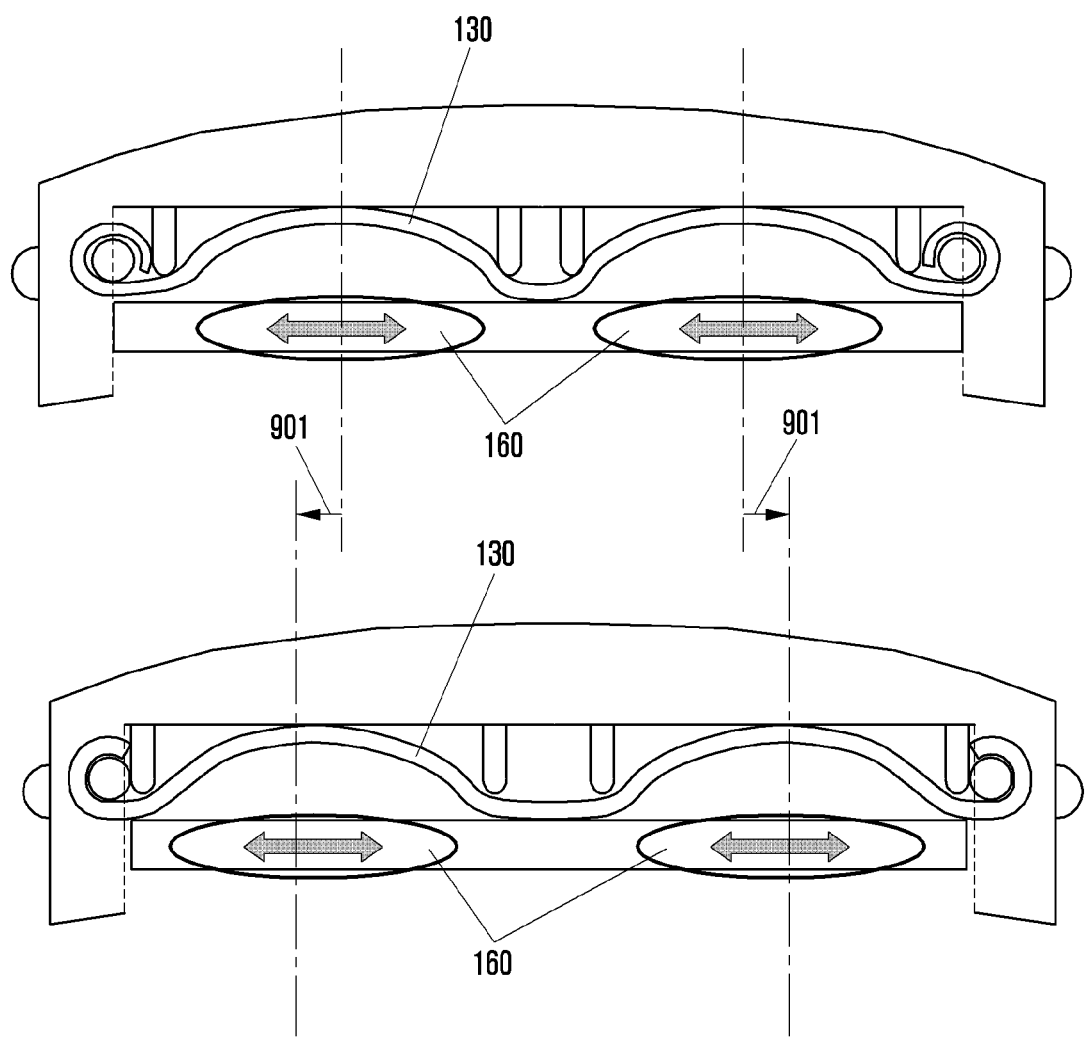
FIG. 9 is a schematic diagram illustrating a change in position of an optical unit of an electronic device in accordance with an example embodiment of the present disclosure.

FIG. 9 is a schematic diagram illustrating a change in position of an optical unit of an electronic device in accordance with an embodiment of the present disclosure.

Referring to FIG. 9, the optical unit 160 may move in response to a movement of the center of curved surface in the display unit 130. For example, as shown in FIG. 9, when the center of curved surface of the display unit 130 moves outward as indicated by a reference numeral 901, the optical unit 160 may also move outward. Therefore, the center of the optical unit 160 can be located at the same line as the center of curved surface of the display unit 130. This may prevent an image distortion.

Figure 10A:
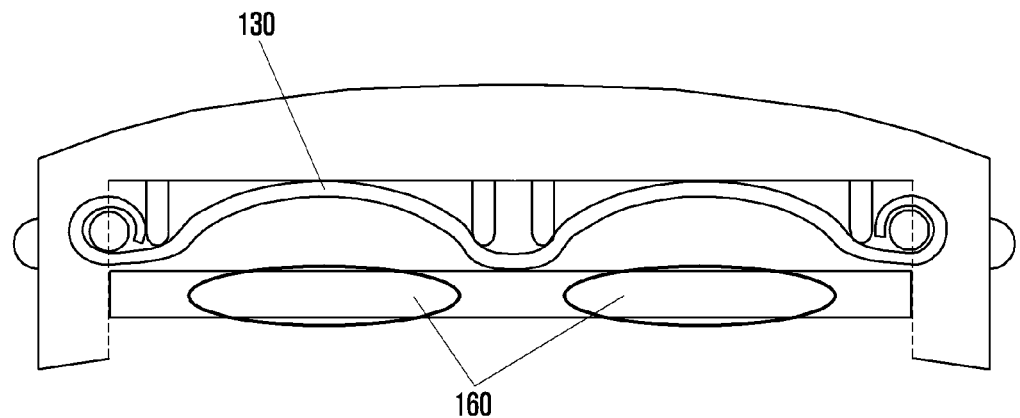
FIG. 10A and FIG. 10B are schematic diagrams illustrating a control of refractive index of an optical unit of an electronic device in accordance with an example embodiment of the present disclosure.
Figure 10B:
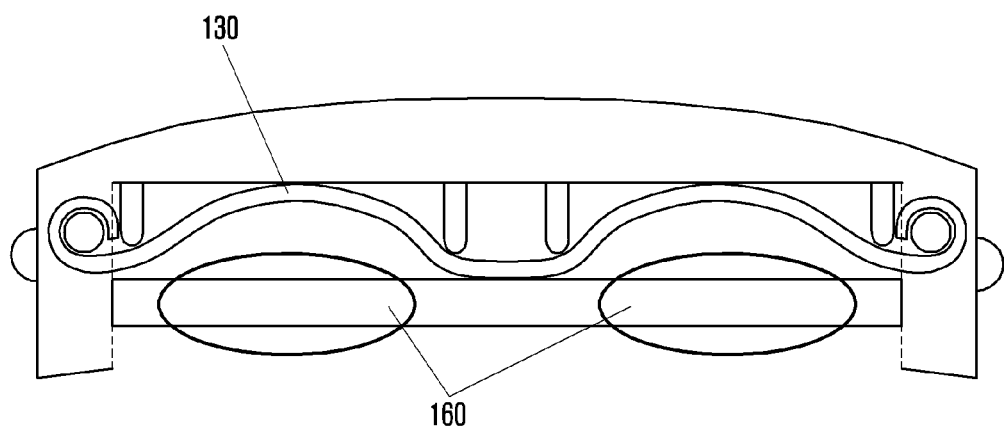

FIGS. 10A and 10B are schematic diagrams illustrating a control of refractive index of an optical unit of an electronic device in accordance with an embodiment of the present disclosure.

Referring to FIGS. 10A and 10B, the optical unit 160 may be changed in a refractive index in response to a change in curvature of the display unit 130. As known from a comparison between FIGS. 10A and 10B, the refractive index (e.g., thickness of lens) of the optical unit 160 is varied according to the curvature of the display unit 130. In case the optical unit 160 has a plurality of lenses, the optical unit 160 may adjust the arrangement or intervals of lenses.

Figure 11:
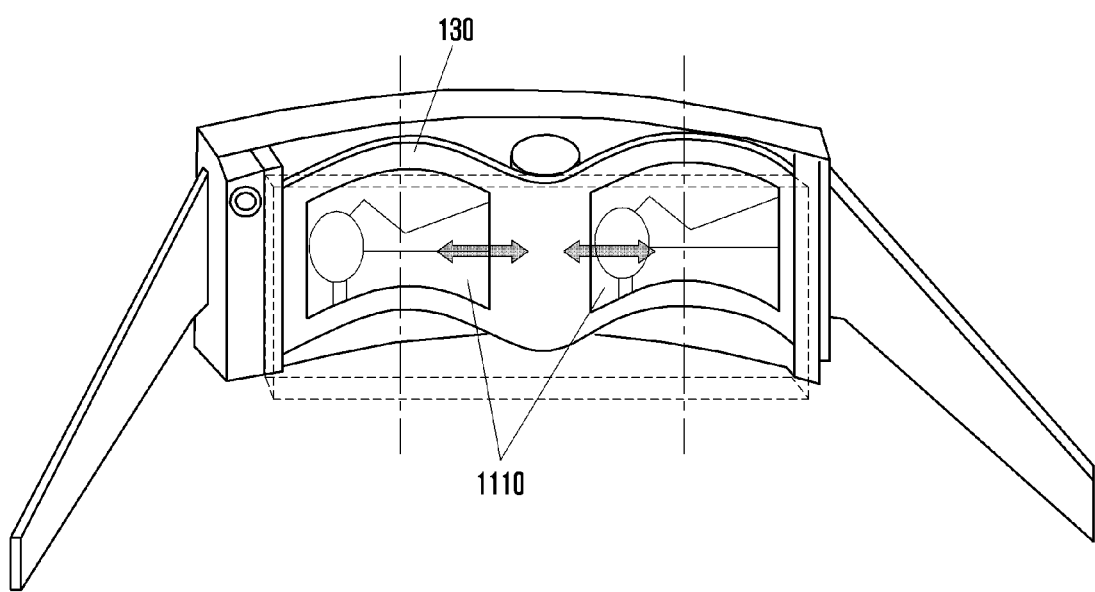
FIG. 11 is a perspective view illustrating an image display operation of an electronic device in accordance with an example embodiment of the present disclosure.

FIG. 11 is a perspective view illustrating an image display operation of an electronic device in accordance with an embodiment of the present disclosure.

Referring to FIG. 11, the display unit control module 113 of the electronic device 400 may control the output position of an image on the display unit 130. For example, the display unit control module may control the output position of an image 1110 such that the center of the image 1110 may coincide with the center of a convex part of the display unit 130. Therefore, the electronic device 400 can offer a focused and non-distorted image 1110 to a user. In this case, the display unit control module 113 may move the image 1110 leftward or rightward to adjust a focus.

Figure 12:
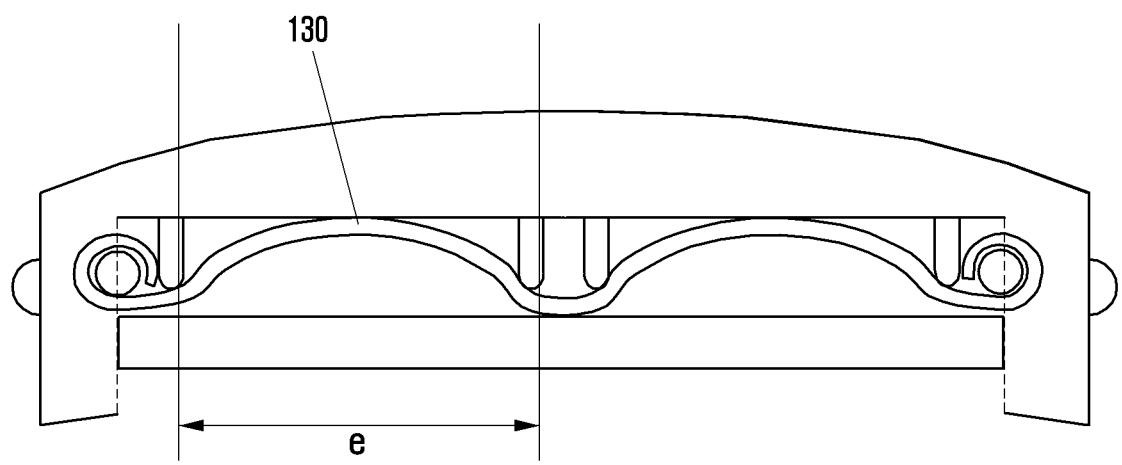
FIG. 12 is a schematic diagram illustrating curvature information of an example electronic device in accordance with an embodiment of the present disclosure.

FIG. 12 is a schematic diagram illustrating curvature information of an electronic device in accordance with an embodiment of the present disclosure.

Referring to FIG. 12, curvature information of the display unit 130 may have a horizontal length (e) of a curved portion. A user may see an image displayed on the curved portion of the display unit 130 and fail to see an image displayed on the other portion except the curved portion since the latter image is out of viewing angle. For example, in case the horizontal length (e) of the curved portion is changed, the control unit 110 (e.g., the display unit control module 113) may change the size of a display region (e.g., the left display region 130-L and the right display region 130-R) for displaying an image on the display unit 130. For example, when the horizontal length (e) of the curved portion is reduced, the horizontal length (e) of the display region for displaying an image may also be reduced. If the size of an image to be displayed is not adjusted in response to a change of the form of the display unit 130, the size of the entire image to be displayed may be greater than a given display region of the display unit 130. In this case, at least part of the entire image may be not displayed on the display region. In an embodiment of this disclosure, since setting information includes a horizontal length (e) of the display region, the size of an image to be displayed may be changed depending on the size of the display region which is varied accordingly when the form of the display unit 130 is changed.

According to various embodiments, an electronic device (e.g., the electronic device 100 or 400) may include a display unit (e.g., the display unit 130) formed of flexible material having at least one curved surface, a transformation unit (e.g., the transformation unit 180) connected to at least part of the display unit, and a control unit (e.g., the transformation unit control module 111) configured to change a form of the transformation unit. The transformation unit may change a form of the display unit on the basis of a change in the form thereof.

According to various embodiments, the electronic device may include a head-mounted display (HMD).

According to various embodiments, the transformation unit may change a curvature corresponding to the at least one curved surface.

According to various embodiments, the display unit may have a first curved surface and a second curved surface, and the transformation unit may change a distance between a center of the first curved surface and a center of the second curved surface.

According to various embodiments, the transformation unit may have transformable material which is changed in shape in response to at least one of an electronic signal, an optical source, a thermal source, water pressure, or atmospheric pressure.

According to various embodiments, the control unit (e.g., the transformation unit control module 111) may change the form of the transformation unit in response to eye information (e.g., a distance between user's eyes or a viewing angle) associated with a user of the electronic device.

According to various embodiments, the control unit may change the form of the transformation unit in response to authentication information (e.g., iris information, fingerprint information, ID, or password) associated with a user of the electronic device.

According to various embodiments, the control unit may receive the authentication information and obtain setting information (e.g., a curvature of curved surface or a distance between centers of two curved surfaces) associated with a user corresponding to the authentication information.

According to various embodiments, the control unit may change the form of the transformation unit in response to setting information (e.g., a curvature of curved surface or a distance between centers of two curved surfaces) defined according to a user of the electronic device.

According to various embodiments, the display unit may have a first region for displaying a first image and a second region for displaying a second image, and the control unit may change a distance between the first and second regions in response to eye information (e.g., a distance between both eyes) associated with a user of the electronic device.

According to various embodiments, the electronic device may further include an optical unit (e.g., the optical unit 160), and the control unit (e.g., the optical unit control module 112) may determine at least one of a position of the optical unit and a refractive index of the optical unit on the basis of the distance between the first and second regions. For example, in case the optical unit (e.g., lens) has the first optical unit and the second optical unit, the control unit may determine the position of the first optical unit such that the center of the first region coincides with the center of the first optical unit. Similarly, the control unit may determine the position of the second optical unit such that the center of the second region coincides with the center of the second optical unit.

According to various embodiments, the control unit (e.g., the display unit control module 113) may perform, based on the form of the display unit, at least one of an operation of changing a position of an image to be displayed on the display unit and an operation of correcting the image. For example, when the form of the curved surface of the display unit is changed, a distorted image may be seen to a user. In order to prevent this, the control unit may change an image display position or correct an image.

According to various embodiments, an electronic device (e.g., the electronic device 100 or 400) may include a display unit (e.g., the display unit 130) formed of flexible material having at least one curved surface, and at least one transformation unit (e.g., the transformation unit 180) configured to change a form of the display unit in response to eye information (e.g., a distance between both eyes) associated with a user of the electronic device.

According to various embodiments, the transformation unit may change the form of the display unit in response to a user input for requesting a change of the form of the display unit.

Figure 13:
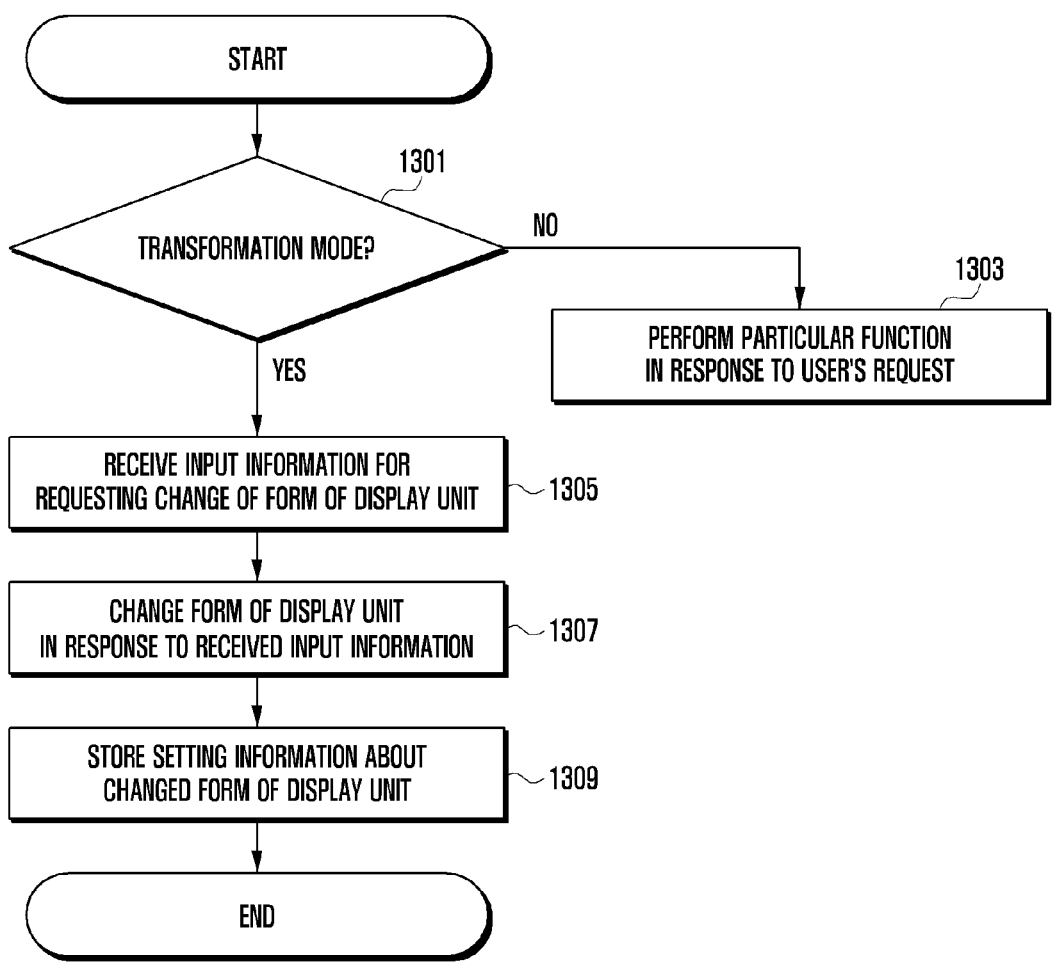
FIG. 13 is a flow diagram illustrating a method for changing the form of a display unit of an electronic device in accordance with an example embodiment of the present disclosure.

FIG. 13 is a flow diagram illustrating a method for changing the form of a display unit of an electronic device in accordance with an example embodiment of the present disclosure.

Referring to FIG. 13, at operation 1301, the electronic device (e.g., the control unit 110) according to an embodiment of this disclosure may check whether a transformation mode for changing the form of the display unit 130 is enabled.

If the transformation mode is disabled, at operation 1303 the electronic device may perform a particular function in response to a user's request or maintain a currently performed function. For example, the control unit 110 as shown in FIG. 4 may perform a music play function, a video playback function, etc. in response to a user's request or maintain an idle state. If the transformation mode is enabled, at operation 1305 the control unit 110 may receive input information for requesting a change of the form of the display unit 130. Then, at operation 1307, the control unit 110 may change the form of the display unit in response to the received input information. This input information may be at least one of a user's input, user's eye information (e.g., user's gaze information), or user authentication information.

For example, in case the form of the display unit 130 is changed in response to a user's input, the control unit 110 may receive a user's input for manipulating the transformation unit 180 through an input unit (e.g., a button, a touch pad, a touch screen, a voice recognition, etc.) and then, in response to the received input, move the transformation unit 180 to a specific extent so as to change the form of the display unit 130. Alternatively, the control unit 110 may control the transformation unit 180 to gradually change the form of the display unit 130. When an output image is perceived as a single image, a user may stop a movement of the transformation unit 180 through an input unit. For example, a user may suitably adjust the form of the display unit 130 by manipulating the transformation unit 180 such that the first image seen to the left eye and the second image seen to the right eye can be seen as a single image.

In case the form of the display unit 130 is changed in response to information about user's eyes, the control unit 110 may activate the image sensor unit 150 and then obtain user's eye information (e.g., a distance between eyes) through the image sensor unit 150. For example, the control unit 110 may measure the position of user's eyes. The control unit 110 may control the transformation unit 180 to change the form of the display unit 130 in response to the obtained eye information. For example, the control unit 110 may control the transformation unit 180 such that the center of a curved surface of the display unit 130 can coincide with the center of each eye recognized through the image sensor unit 150. Namely, in an embodiment, the form of the display unit 130 may be automatically changed through recognition of user's eyes (e.g., pupil).

In case the form of the display unit 130 is changed in response to user authentication information, the control unit 110 may receive the user authentication information about a wearer who wears the electronic device 400. This user authentication information may be biometric information (e.g., iris, fingerprint, etc.) or information (e.g., ID and password) entered by a user.

When any user authentication information is received, the control unit 110 may compare the received user authentication information with previously stored user authentication information. For example, the control unit 110 may check whether there is stored user authentication information identical to the received user authentication information. If there is identical user authentication information, the control unit 110 may control the transformation unit 180 in response to setting information linked to the identical user authentication information. If there is no identical user authentication information, the control unit 110 may perform a process of changing the form of the display unit 130 by using a user's input or information associated with user's eyes. According to this embodiment, in case two or more users use the same electronic device, it is possible to change the form of the display unit 130 per user.

When a change of the form of the display unit 130 is completed, at operation 1309 the electronic device (e.g., the control unit 110) may store therein setting information (e.g., a position of the center of a curved surface, curvature, etc.) about the changed form of the display unit 130. Such stored setting information may be used later for the electronic device to suitably change the form of the display unit even though a user does not change the form of the display unit.

As discussed hereinbefore, a method for operating an electronic device (e.g., the electronic device 100 or 400) may include an operation of obtaining setting information (e.g., information about a curvature of curved surface of a display unit or information about a distance between user's eyes) associated with a user's eye, and an operation of changing a form of at least one curved surface included in a display unit (e.g., the display unit 130) formed of flexible material, based on the obtained setting information.

According to various embodiments, the electronic device may include a head mount display (HMD).

According to various embodiments, the obtaining operation may include determining the setting information on the basis of at least one of a distance between user's eyes or a viewing angle.

According to various embodiments, the obtaining operation may include determining the setting information on the basis of at least one of a user's input or user's eye information. For example, a user may enter the curvature information through a button equipped in the electronic device. The curvature of the curved surface may be determined on the basis of the user's entered information.

According to various embodiments, the obtaining operation may include receiving authentication information about a specific user, and obtaining the setting information linked to the specific user.

According to various embodiments, the changing operation may include changing a curvature corresponding to the at least one curved surface.

According to various embodiments, the display unit may have a first curved surface and a second curved surface, and the changing operation may include changing a distance between a center of the first curved surface and a center of the second curved surface.

According to various embodiments, the changing operation may include changing the display unit on the basis of a change of transformable material (e.g., the transformation unit 180) which is changed in shape in response to at least one of an electronic signal, an optical source, a thermal source, water pressure, or atmospheric pressure.

According to various embodiments, in case the display unit has a first region for displaying a first image and a second region for displaying a second image, the method for operating the electronic device may further include an operation of changing a distance between the first and second regions in response to eye information associated with a user of the electronic device.

According to various embodiments, the electronic device may include an optical unit, and the method may include an operation of determining at least one of a position of the optical or and a refractive index of the optical unit on the basis of the distance between the first and second regions.

According to various embodiments, the method may further include, based on the form of the display unit, an operation of changing a position of an image to be displayed on the display unit or an operation of correcting the image.

According to various embodiments, the operation of changing the form of at least one curved surface in the display unit may include an operation of changing the form of the display unit in response to a user input for requesting a change of the form of the display unit.

As fully discussed hereinbefore, a device having a flexible display unit and a method for operating the device may freely change the form of the display unit. In embodiments, the form of the display unit may be automatically changed according to positions of user's eye. In embodiments, information (e.g., curvature and central distance) about the form of the display unit may be stored according to users, and the form of the display unit may be automatically changed in response to the stored information about a specific user recognized. Namely, since a display form can be modified to fit a selected user, it is possible to prevent any user's inconvenience (e.g., eye strain, dizziness, etc.).

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

According to various embodiments, a computer-readable medium may record thereon a program for executing an operation of obtaining setting information associated with a user's eye, and an operation of changing a form of at least one curved surface included in a display unit formed of flexible material, based on the obtained setting information.

While this disclosure has been particularly shown and described with reference to an example embodiment thereof, it will be understood by those skilled in the art that various changes in form and details may be made therein without departing from the ambit of this disclosure as defined by the appended claims.

The above-described embodiments of the present disclosure can be implemented in hardware, firmware with, for example the execution of supporting software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Some functions and steps provided in the Figures may be implemented in hardware with software and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

What is claimed is:

1. An electronic device comprising:
a display unit formed of flexible material having a first curved surface to display a first image to a left eye of a user and a second curved surface to display a second image to a right eye of the user, wherein the first image is same as the second image;
a transformable support member coupled to at least part of the display unit; and
a processor configured to move the transformable support member to deform the display unit in order for the first image and the second image to appear to the user as having a substantially same size and/or position.

2. The electronic device of claim 1, wherein the electronic device further includes:
a head mounted display (HMD); and
a housing to which the display unit is coupled, the transformable support member disposed between the housing and the display unit.

3. The electronic device of claim 1, wherein the deformation changes a curvature of the first curved surface and/or the second curved surface.

4. The electronic device of claim 1, wherein the transformable support member is further configured to change a distance between a center of the first curved surface and a center of the second curved surface by the deformation.

5. The electronic device of claim 1, wherein the transformable support member further comprises at least one of:
a transformable material that deforms in response to at least one of an electronic signal, an optical source, a thermal source, water pressure, or atmospheric pressure;
one or more support members automatically moveable along at least one axis by control of the processor; and
one or more support members manually moveable along at least one axis by direct manipulation by a user.

6. The electronic device of claim 1, further comprising:
an image sensor unit adapted to capture an image of the user;
wherein the processor is further configured to alter the transformable support member in response to the image of the user captured by the image sensor unit.

7. The electronic device of claim 6, further comprising:
an image sensor unit adapted to capture an image of the user; and
wherein the processor is further configured to change a distance between the first curved surface and the second curved surface by altering the transformable support member in response to the image of the user captured by the image sensor unit.

8. The electronic device of claim 7, further comprising:
an optical unit,
wherein the processor is further configured to change at least one of a position of the optical unit and a refractive index of the optical unit based on changed distance between the first curved surface and the second curved surface.

9. The electronic device of claim 1, wherein the processor is further configured to alter the transformable support member in response to authentication information associated with the user.

10. The electronic device of claim 1, wherein the processor is further configured to:
receive setting information from the user indicating a configuration of the transformable support member; and
alter the transformable support member in response to the setting information.

11. The electronic device of claim 1, wherein, after the transformable support member is moved, the processor is further configured to execute at least one of:
change positions of the first image and the second image displayed on the display unit; and
correct the first image and the second image displayed on the display unit.

12. An electronic device comprising:
an image sensor unit adapted to capture an image of a user;
a display unit formed of flexible material having a first curved surface to display a first image to a left eye of the user and a second curved surface to display a second image to a right eye of the user, wherein the first image is same as the second image; and
at least one transformable support member coupled to the display unit and configured to deform the display unit according to movement of the at least one transformable support member based on information on the left eye and the right eye as identified in the image of the user captured by the image sensor unit, in order for the first image and the second image to appear to the user as having a substantially same size and/or position.

13. The electronic device of claim 12, wherein the at least one transformable support member is further configured to deform of the display unit in response to an input requesting a change of the first curved surface or the second curved surface of the display unit.

14. A method for operating an electronic device, the method comprising:
displaying, on a first curved surface of a display unit formed of flexible material, a first image to a left eye of a user;
displaying, on a second curved surface of the display unit, a second image to a right eye of the user, wherein the first image is same as the second image;
obtaining, via a processor of the electronic device, setting information associated with the user's eyes; and
changing a form of the first curved surface or the second curved surface according to movement of a transformable support member based on the obtained setting information, in order for the first image and the second image to appear to the user as having a substantially same size and/or position.

15. The method of claim 14, wherein the setting information includes at least one of a distance between the user's eyes, a viewing angle of the user's eyes and a user configuration.

16. The method of claim 14, further comprising:
actuating, via the processor, alteration of at least one transformable support member coupled to the display unit to cause deformation of the flexible material.

17. The method of claim 16, wherein the at least transformable support member is actuated by at least one of:
input of an electronic signal, an optical source, a thermal source, water pressure, or atmospheric pressure to cause a physical transformation of the transformable support member; and
transmission of a signal from the processor causing automatic movement of the transformable support member.

18. The method of claim 14, further comprising:
authenticating the user of the electronic device; and
obtaining the setting information for the authenticated user.

19. The method of claim 14, wherein changing the form further comprises changing a curvature of the first curved surface or the second curved surface.

20. The method of claim 14, wherein changing the form further comprises altering a distance between a center of the first curved surface and a center of the second curved surface.

\* \* \* \* \*